UNITED STATES PATENT OFFICE.

JAMES P. PERKINS, OF PULLMAN, ILLINOIS.

COMPOSITION FOR THE MANUFACTURE OF BRICKS, &c.

SPECIFICATION forming part of Letters Patent No. 364,854, dated June 14, 1887.

Application filed February 14, 1887. Serial No. 227,584. (No specimens.)

*To all whom it may concern:*

Be it known that I, JAMES P. PERKINS, of Pullman, in the county of Cook and State of Illinois, have invented certain new and useful Improvements in the Manufacture of Bricks and other Burned Products of Clay; and I do hereby declare that the following is a full, clear, and exact description thereof.

This invention relates to that class of compounds for the manufacture of bricks and other burned products of clay in which oil is mixed with the clay before the articles are burned, an instance of such class being set forth in Letters Patent of the United States, numbered 318,792, granted to me May 26, 1886.

The distinctive object of the present invention is to provide for the retention of the oil until the actual operation of burning proper is to be performed, and to not only greatly improve the product, but to save waste, shorten the work of burning, and render the operations of drying and initial heating safe alike to the operatives and to the works.

More specifically stated, the object is to avoid evaporization or ignition of the oil in the preliminary steps of drying and initial heating in the burning-kiln, and thus to obtain the full advantages of the oil in the final operation of burning proper and in the finished product.

In the manufacture of bricks a drying-kiln is sometimes (though not always) used, in which the bricks are only partially dried preparatory to piling them in the burning-kiln. Whether the bricks have been dried or not in such a drying-kiln, there are two distinct (though sometimes continuous) steps in the treatment of the bricks within said burning-kiln. The first step is what is sometimes known as "tempering" or "driving off" the "water-smoke," and the second is the burning proper. The first step consists in gradually producing and maintaining a relatively-low heat in the kiln until the water is practically wholly expelled from the bricks, in order that they will not crack in the subsequent operation of burning. The second consists in rapidly raising the temperature and maintaining it until the burning is accomplished.

Now, in the use of oil in the manufacture of bricks as heretofore practiced, it has never been sought to retain the oil until, and to fully utilize it in, the final or burning operation, and consequently not only have the potential advantages of the oil been in large measure unrealized in this operation and in the finished product, but such waste, danger, and harm have resulted from escape or ignition of the oil as to have practically defeated its use altogether. The present invention contemplates the obviation of these difficulties and at the same time the production of a better product.

To these ends the invention consists in mixing or compounding the clay with a particular kind of artificial oil, which is at once destitute of those volatile constituents which evaporate or ignite at a low temperature, and is productive of the best results in its effects upon the appearance, strength, and texture of the finished product. This particular kind of oil is known in the United States as "intermediate oil" or "paraffine distillate." It is produced by the distillation of the tarry residuum remaining in the still after the distillations by which naphtha, illuminating-oils, and other less highly inflammable products have been drawn off from the remaining constituents of crude petroleum. The oil thus produced is relatively heavy or non-inflammable, having a high boiling-point, and it is therefore adapted to withstand the temperature employed in brick-drying kilns and ordinarily reached in the initial operation of tempering in burning-kilns without wasteful evaporation or liability to "flash" or take fire. Such intermediate oil usually contains a consideraable part of the paraffine present in the crude petroleum; but this paraffine may or may not be separated from the oil prior to its use in this manufacture, as desired.

The temperature of kilns for drying formed articles of clay preparatory to burning is commonly not higher than 260° Fahrenheit. That of the burning-kiln in the first operation of tempering usually reaches a somewhat higher degree. I have obtained good results from the use of intermediate oil which vaporizes or boils at from 260° to 325° Fahrenheit. Inasmuch as the initial temperatures of these preliminary operations are variable, I do not wish to be restricted to a particular boiling or vaporizing point on the part of the intermediate oil employed, but to the use of such intermediate oil as is adapted to withstand the temperature of a practical drier and the initial tempering heat of the burning-kiln. It is, however, to be remarked that in the use of this oil the tempering and burning operations may be made continuous, the heat being rapidly raised in the kiln as soon as the bricks are in a tempered condition or have ceased or nearly ceased to emit the water-smoke.

The results herein contemplated cannot be obtained by the use of the tarry residuum which remains after any distillation in petroleum-refining. Wherefore I am restricted to the use of an oil or distillate having the characteristics above set forth as distinguished from the tarry residue remaining in the still after the process of distillation. I do not, however, wish to be restricted to the use of such an oil which vaporizes or boils at the particular degree specified.

It is of course understood that paraffine distillate may be obtained from other sources than that above mentioned.

In putting the invention into practice the oil will commonly be mixed with the clay in the operation of grinding or tempering the latter with water, and preferably after it has been partially ground. The mixing may, however, be accomplished after the clay has been completely ground, and by means of a separate mixing apparatus of any suitable kind.

The amount of intermediate oil to be used with a given quantity of clay will vary according to the condition of the clay. In the case of the ordinary brick-clays of the northwest a barrel of oil may be mixed with a quantity of clay sufficient to make twenty thousand bricks. Proper variations from these proportions will be determined readily by experiment. An advantage of the intermediate oil is found at this point in its use, in that it mixes more readily with the clay, is less greasy, and is less disposed to float off with the water used in the mixing than either crude petroleum or other lighter oils.

The intermediate oil herein referred to has the usual effect of oil in lubricating the molds and smoothing the surface of the article molded; but it has better effect than other oils in producing a glazed surface upon the burned product, and in toughening and strengthening the same. It is also destitute of substances calculated to injuriously affect the color or texture of the product, while from its more full or perfect retention until the final operation of burning, in which it forms a fuel, it shortens the work of burning by the greater amount of such fuel that it furnishes and insures a larger percentage of perfectly-burned, uniformly-colored, symmetrical, and high-grade bricks.

I claim as my invention—

The within-described compound for the manufacture of bricks and other burned products of clay, consisting of a moist mixture of clay and paraffine distillate, otherwise known as "intermediate oil," substantially as and for the purposes set forth.

In testimony that I claim the foregoing as my invention I affix my signature in presence of two witnesses.

JAMES P. PERKINS.

Witnesses:
M. E. DAYTON,
CHARLES T. LORING.